United States Patent
Canoy et al.

(10) Patent No.: US 9,710,749 B2
(45) Date of Patent: Jul. 18, 2017

(54) METHODS AND APPARATUS FOR IMPLEMENTING A BREAKPOINT DETERMINATION UNIT IN AN ARTIFICIAL NERVOUS SYSTEM

(71) Applicant: QUALCOMM Incorporated, San Diego, CA (US)

(72) Inventors: Michael-David Nakayoshi Canoy, San Diego, CA (US); William Richard Bell, II, Carlsbad, CA (US); Ramakrishna Kintada, San Diego, CA (US); Venkat Rangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 14/281,118

(22) Filed: May 19, 2014

(65) Prior Publication Data

US 2015/0066826 A1    Mar. 5, 2015

Related U.S. Application Data

(60) Provisional application No. 61/873,044, filed on Sep. 3, 2013.

(51) Int. Cl.

| | |
|---|---|
| *G06N 3/10* | (2006.01) |
| *G06N 3/04* | (2006.01) |
| *G06F 11/30* | (2006.01) |
| *G06N 3/08* | (2006.01) |
| *G06F 11/36* | (2006.01) |

(52) U.S. Cl.
CPC ............... *G06N 3/10* (2013.01); *G06N 3/049* (2013.01); *G06F 11/302* (2013.01); *G06F 11/3636* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 6,560,592 B1 * | 5/2003 | Reid | ............ G06F 17/3051 706/6 |
| 6,937,962 B2 | 8/2005 | Rousseau et al. | |
| | | (Continued) | |

FOREIGN PATENT DOCUMENTS

EP    0439343 A2    7/1991

OTHER PUBLICATIONS

Jin, X. et al. (2010). "Algorithm and software for simulation of spiking neural networks on the multi-chip SpiNNaker system." The 2010 International Joint Conference on Neural Networks (IJCNN), Jul. 2010. 8 pages. DOI: 10.1109/IJCNN.2010.5596759.*

(Continued)

*Primary Examiner* — Paulinho E Smith
*Assistant Examiner* — Benjamin Buss
(74) *Attorney, Agent, or Firm* — Patterson & Sheridan, LLP

(57) ABSTRACT

Methods and apparatus are provided for using a breakpoint determination unit to examine an artificial nervous system. One example method generally includes operating at least a portion of the artificial nervous system; using the breakpoint determination unit to detect that a condition exists based at least in part on monitoring one or more components in the artificial nervous system; and at least one of suspending, examining, modifying, or flagging the operation of the at least the portion of the artificial nervous system, based at least in part on the detection.

32 Claims, 13 Drawing Sheets

N1, N2, N3 – Spiking Neuron
B1 – Breakpoint Neuron

(56) References Cited

U.S. PATENT DOCUMENTS

| | | |
|---|---|---|
| 2006/0101405 A1 | 5/2006 | Buschardt et al. |
| 2007/0130491 A1 | 6/2007 | Mazumder |
| 2012/0109863 A1 | 5/2012 | Esser et al. |
| 2012/0233104 A1 | 9/2012 | Wang et al. |
| 2013/0031039 A1 | 1/2013 | Sim et al. |

OTHER PUBLICATIONS

Brette R., et al., "Simulation of networks of spiking neurons: a review of tools and strategies", Journal of Computational Neuroscience, vol. 23, No. 3, Jul. 12, 2007 (Jul. 12, 2007), pp. 349-398, XP019552702, DOI: 10.1007/S10827-007-0038-6 the whole document.

International Search Report and Written Opinion—PCT/US2014/051044—ISA/EPO—Mar. 31, 2015.

Jin X., et al., "Algorithm and software for simulation of spiking neural networks on the multi-chip SpiNNaker system", Neural Networks (IJCNN), The 2010 International Joint Conference on, IEEE, Piscataway, NJ, USA, Jul. 18, 2010 (Jul. 18, 2010), pp. 1-8, XP031771712, ISBN: 978-1-4244-6916-1.

Renaud S., et al., "PAX: A mixed hardware/software simulation platform for spiking neural networks", Neural Networks, Elsevier Science Publishers, Barking, GB, vol. 23, No. 7, Sep. 1, 2010 (Sep. 1, 2010), pp. 905-916, XP027160165, ISSN: 0893-6080 [retrieved on Jul. 20, 2010].

\* cited by examiner

METHODS AND APPARATUS FOR IMPLEMENTING A BREAKPOINT DETERMINATION UNIT IN AN ARTIFICIAL NERVOUS SYSTEM

CLAIM TO PRIORITY UNDER 35 U.S.C. §119

This application claims benefit of U.S. Provisional Patent Application Ser. No. 61/873,044, filed Sep. 3, 2013 and entitled "Methods and Apparatus for Implementing a Breakpoint Neuron in an Artificial Nervous System," which is herein incorporated by reference in its entirety.

BACKGROUND

Field

Certain aspects of the present disclosure generally relate to artificial nervous systems and, more particularly, to using one or more breakpoint determination units in a neural processing system.

Background

An artificial neural network, which may comprise an interconnected group of artificial neurons (i.e., neural processing units), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to implementing a breakpoint determination unit in an artificial nervous system.

Certain aspects of the present disclosure provide a method for using a breakpoint determination unit to examine an artificial nervous system. The method generally includes operating at least a portion of the artificial nervous system; using the breakpoint determination unit to detect that a condition exists based at least in part on monitoring one or more components in the artificial nervous system; and at least one of suspending, examining, modifying, or flagging the operation of the at least the portion of the artificial nervous system, based at least in part on the detection.

Certain aspects of the present disclosure provide an apparatus for using a breakpoint determination unit to examine an artificial nervous system. The apparatus generally includes a processing system and a memory coupled to the processing system. The processing system is typically configured to operate at least a portion of the artificial nervous system; to use the breakpoint determination unit to detect that a condition exists based at least in part on monitoring one or more components in the artificial nervous system; and to at least one of suspend, examine, modify, or flag the operation of the at least the portion of the artificial nervous system, based at least in part on the detection.

Certain aspects of the present disclosure provide an apparatus for using a breakpoint determination unit to examine an artificial nervous system. The apparatus generally includes means for operating at least a portion of the artificial nervous system; means for using the breakpoint determination unit to detect that a condition exists based at least in part on monitoring one or more components in the artificial nervous system; and means for at least one of suspending, examining, modifying, or flagging the operation of the at least the portion of the artificial nervous system, based at least in part on the detection.

Certain aspects of the present disclosure provide a computer program product for using a breakpoint determination unit to examine an artificial nervous system. The computer program product generally includes a computer-readable medium (e.g., a storage device or other non-transitory medium) having instructions executable to operate at least a portion of the artificial nervous system; to use the breakpoint determination unit to detect that a condition exists based at least in part on monitoring one or more components in the artificial nervous system; and to at least one of suspend, examine, modify, or flag the operation of the at least the portion of the artificial nervous system, based at least in part on the detection.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
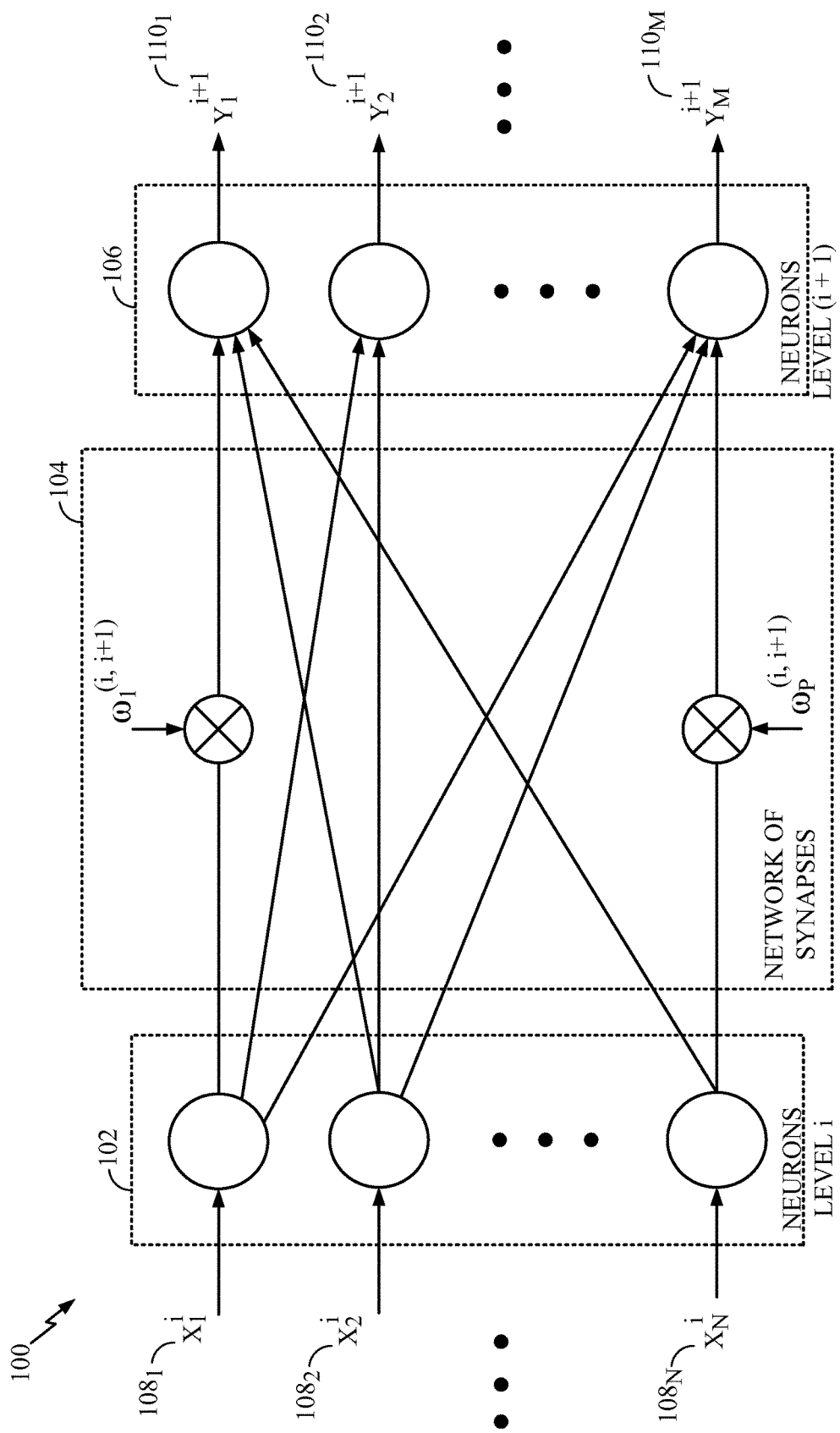
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
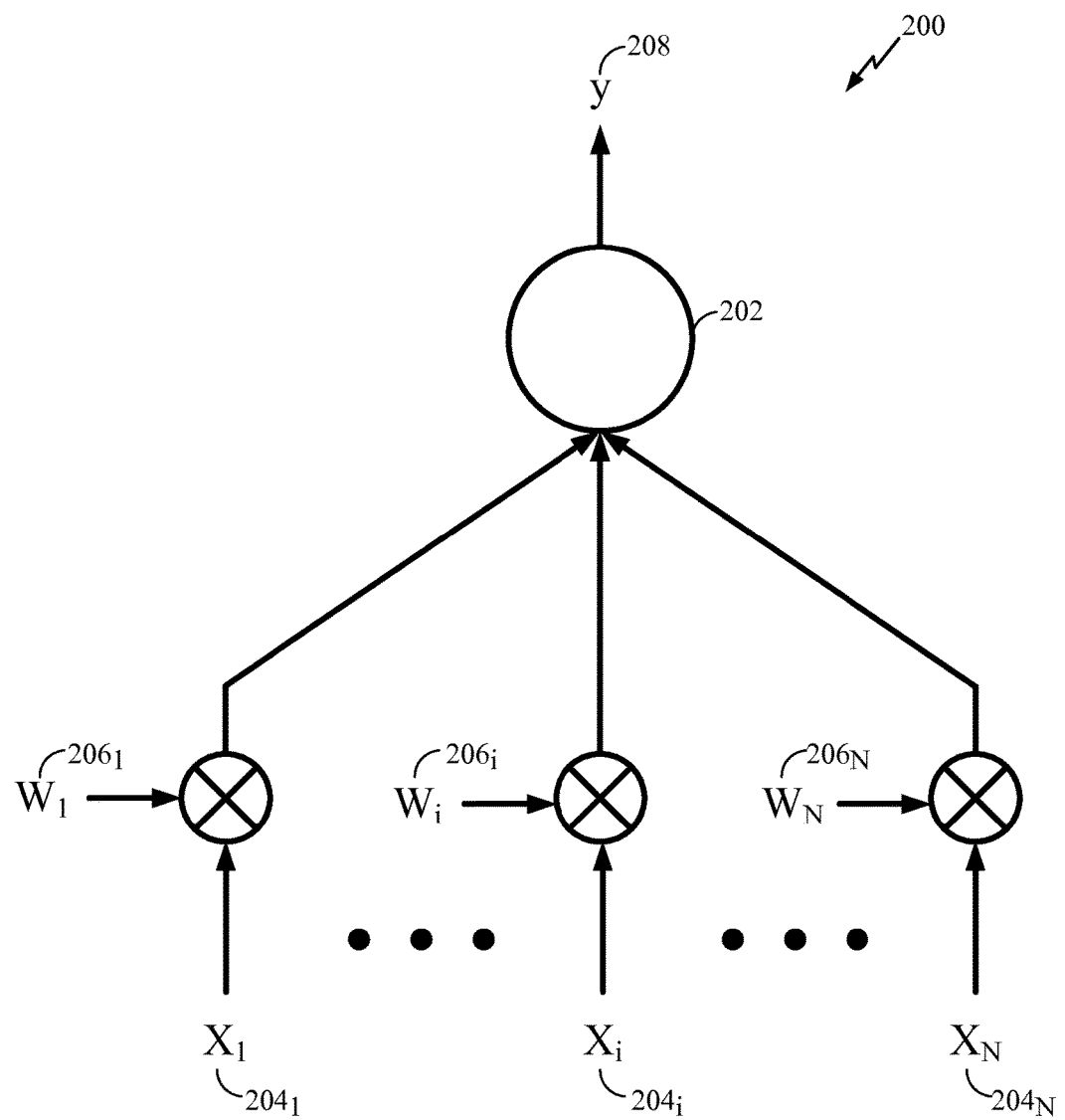
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel.

Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output,), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, t > 0 \\ a_- e^{t/k_-}, t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
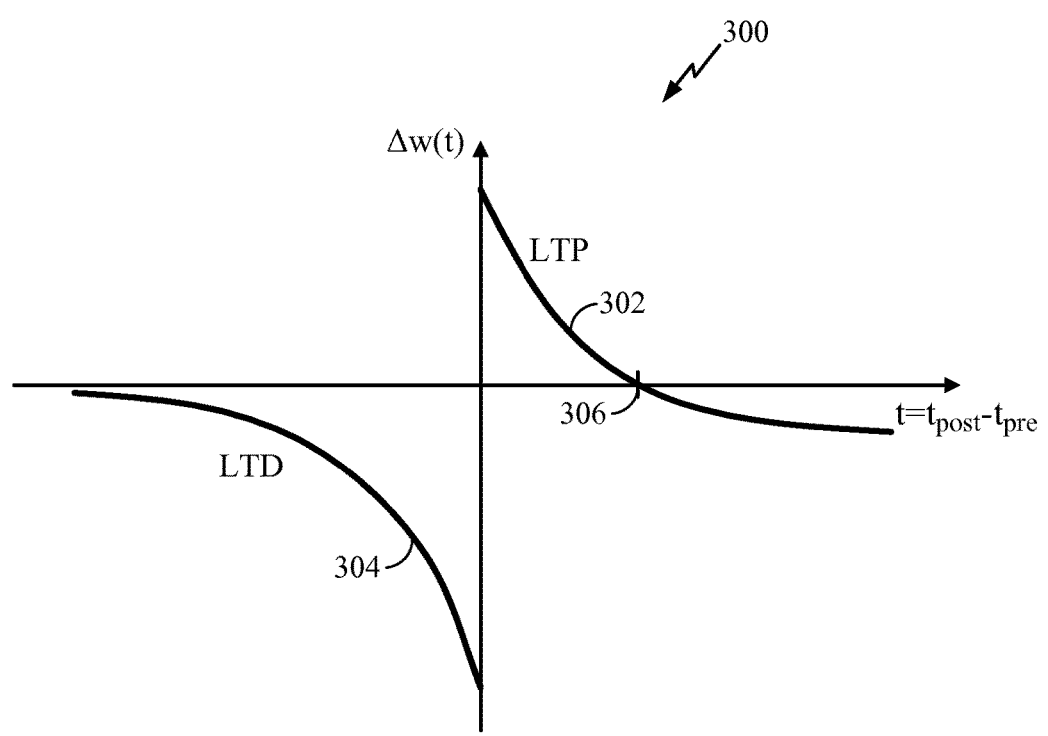
FIG. 3 illustrates an example spike-timing dependent plasticity (STDP) curve in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
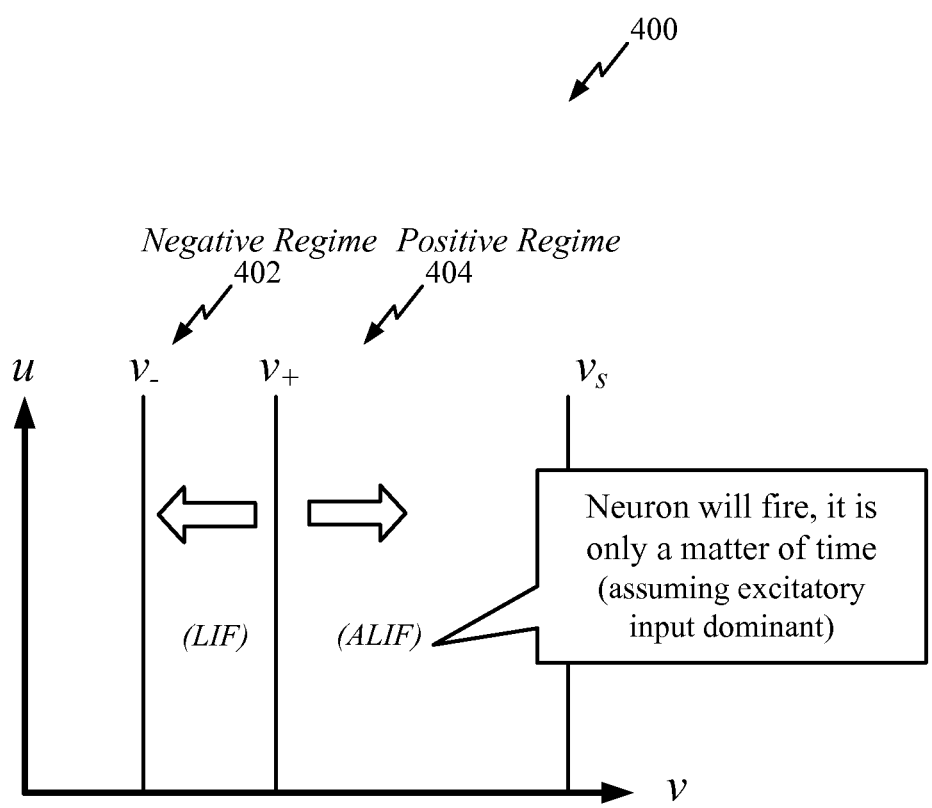
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter δ is a scale factor controlling the slope of the u null-cline. The parameter ε is typically set equal to $-v_-$. The parameter β is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed-form solution is possible not only for state (and with a single exponential term), but also for the time required to reach a particular state. The closed-form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events, such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Example Breakpoint Determination Unit

A neural processor is a device that performs neural processing (e.g., using spikes, artificial neurons, neuromodulators, etc.) in order to execute a behavior. The behavior is trained into the processor. However, training is an imperfect science and may take a long time. Thus, it becomes advantageous to define methods that allow one to discover the issues faster.

Debugging is the process of detecting the issue in a neural processor. Types of debugging include telemetry monitoring and halting of execution followed by an inspection of neural state. However knowing when to halt the execution of the processors is a non-trivial thing.

Accordingly, what is needed are techniques and apparatus for at least one of suspending, examining, modifying, or flagging the execution of an artificial nervous system or a portion thereof.

Certain aspects of the present disclosure aim to solve the issue regarding when to begin inspection of the neural state for debugging by triggering an event when a condition exists where debugging a neural processor should begin. This detection is done seamlessly during execution without monitoring from an external entity. In contrast, the monitoring may be accomplished with a breakpoint determination unit, which may be internal to an artificial nervous system. For certain aspects, the breakpoint determination unit may be implemented as a breakpoint neuron, which may behave similarly to a typical spiking neuron in the neural processor, except that the breakpoint neuron may be configured to generate a notification event under a specific condition. This generated notification event may lead to a suspension of spike processing.

Spiking neurons in the neural processor generate spikes and are interconnected using synapses. Spike information is conveyed between spiking neurons. Receive spiking neurons process the spikes from all transmit spiking neurons connected to the receive spiking neurons. Receive spiking neurons process the information and determine if a spike should be generated. Spike generation occurs when the receive spiking neuron is driven beyond a threshold parameter (i.e., voltage) value. Threshold parameters are configurable.

A breakpoint neuron processes information similarly. However, upon crossing the threshold, the breakpoint neuron may transmit an event that may cause the neural processor to stop all spike process and suspend all state transitions. Example event notification mechanisms include interrupts, message packets, and a change in a status register.

Figure 5:
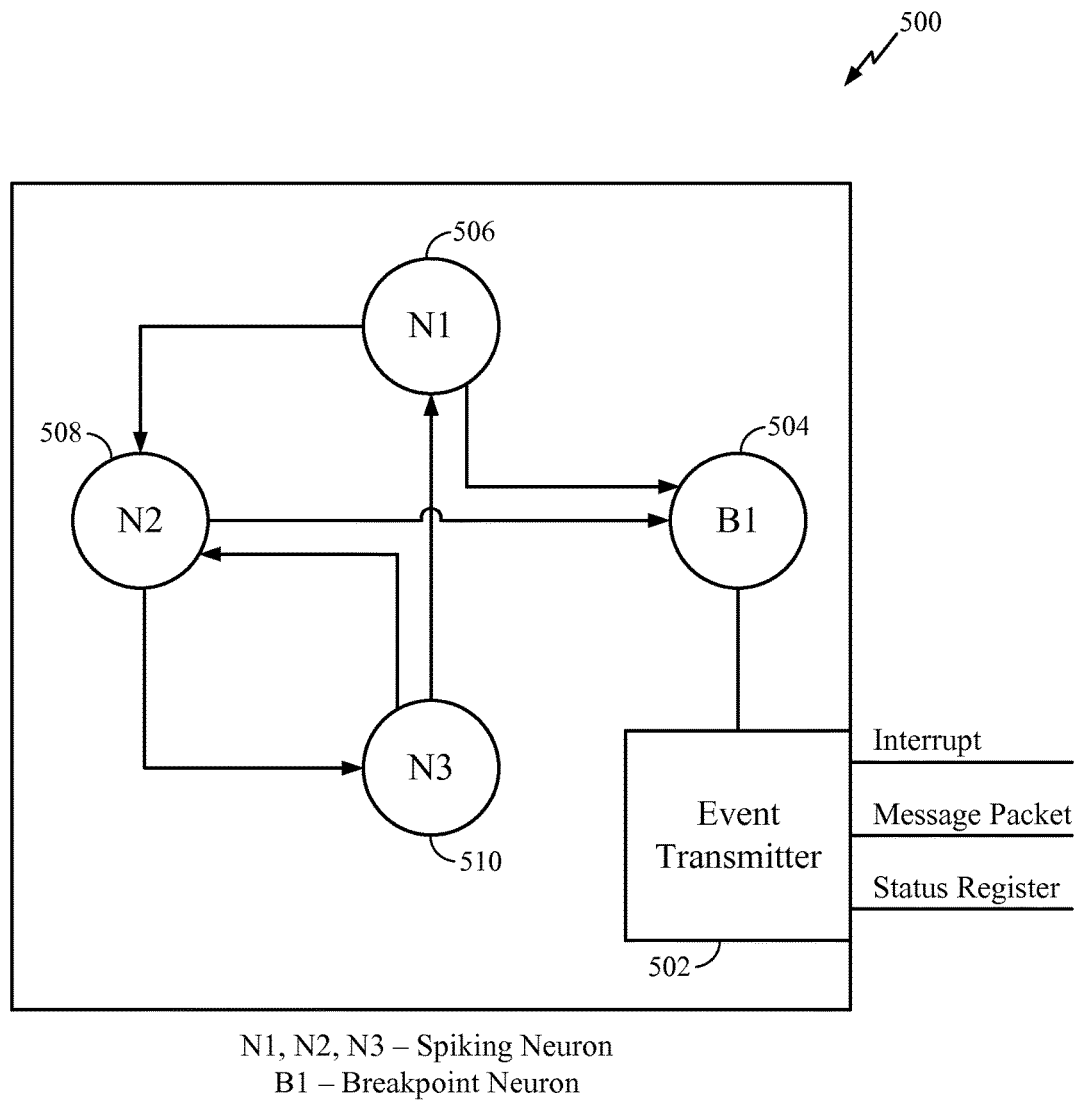
FIG. 5 illustrates an example neural processing system having a breakpoint neuron, in accordance with certain aspects of the present disclosure.

For example, FIG. 5 illustrates an example neural processing system 500 having a breakpoint neuron B1 504. Breakpoint neuron B1 504 is configured to stop neural processor spike processing when artificial neuron N1 506 fires. At time zero, artificial neuron N3 510 fires, and two time steps later, N1 506 fires. B1 504 immediately detects that N1 506 has fired. At the end of the current time step, B1 504 generates an event from event transmitter 502, and the processing is halted. The event may occur immediately or at the end of a synchronous time boundary, for example. Spike processing delay may be used when processing spikes from monitored spiking neurons.

A breakpoint determination unit may also or alternatively be configured to stop neural processor spike processing based on conditions other than the firing of one or more artificial neurons. For example, a breakpoint determination unit may be connected with memory or registers associated with one or more artificial neurons or global storage that can be used to store variables or system parameters for the artificial nervous system or a portion thereof. By monitoring one or more values in the global storage or the memory or registers of one or more artificial neurons, a breakpoint determination unit may detect a change in one or more values stored in these locations and generate an event from the event transmitter, which may halt the operation. As another example, a breakpoint determination unit may be configured to halt execution of the artificial nervous system (or a portion thereof) if one or more of the stored values meets a particular inequality relation (e.g., is greater than or equal to a predetermined threshold) or a combination thereof.

Figure 6:
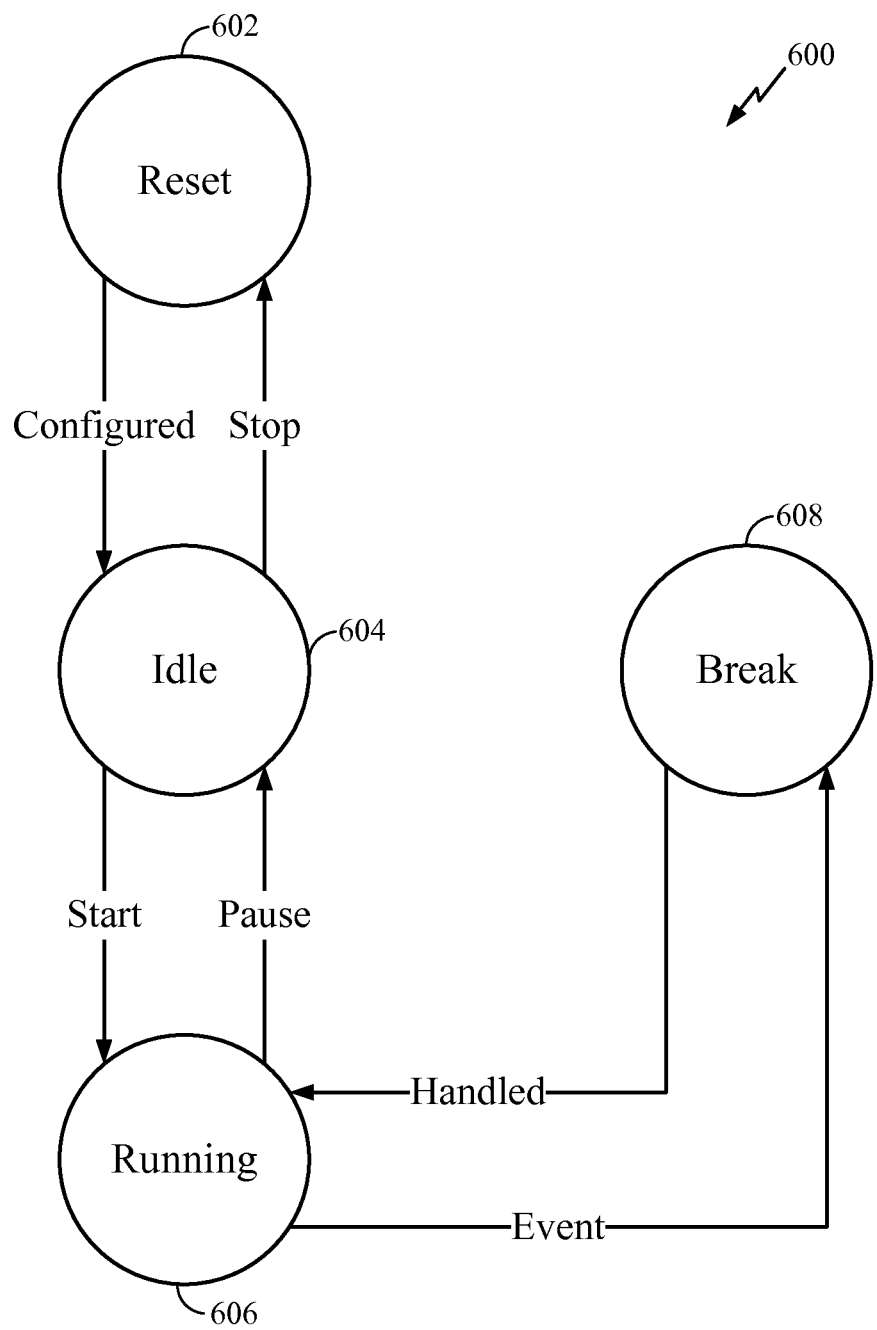
FIG. 6 illustrates an example state machine for a breakpoint determination unit, in accordance with certain aspects of the present disclosure.

FIG. 6 illustrates an example state machine 600 for a breakpoint determination unit, such as breakpoint neuron B1 in FIG. 5. A Reset state 602 is the initial state where no spike monitoring is occurring. The breakpoint determination unit may be configured with a condition (threshold set), and a set of transmit neurons to be monitored may be identified. The breakpoint determination unit is a receive neuron for the set of transmit neurons. Once configured, the breakpoint determination unit may transition to an Idle state 604.

In the Idle state 604, the breakpoint determination unit is awaiting a Start command to begin monitoring. A Stop command may cause the state transition to the Reset state 602.

In a Running state 606, the breakpoint determination unit is monitoring for transmit neuron spikes. After processing of received spikes, if the transmit neurons' spikes drive the system beyond the threshold value (or some other condition exists), the breakpoint determination unit will generate an event. A spike may be generated, as well. The event generation may cause the transition to a Break state 608. A Pause trigger may cause a transition to the Idle state 604.

In the Break state 608, the monitoring has stopped. The breakpoint determination unit may stay in this state until the break event is handled (e.g., after troubleshooting), causing the transition back to the Running state 606.

Figure 7:
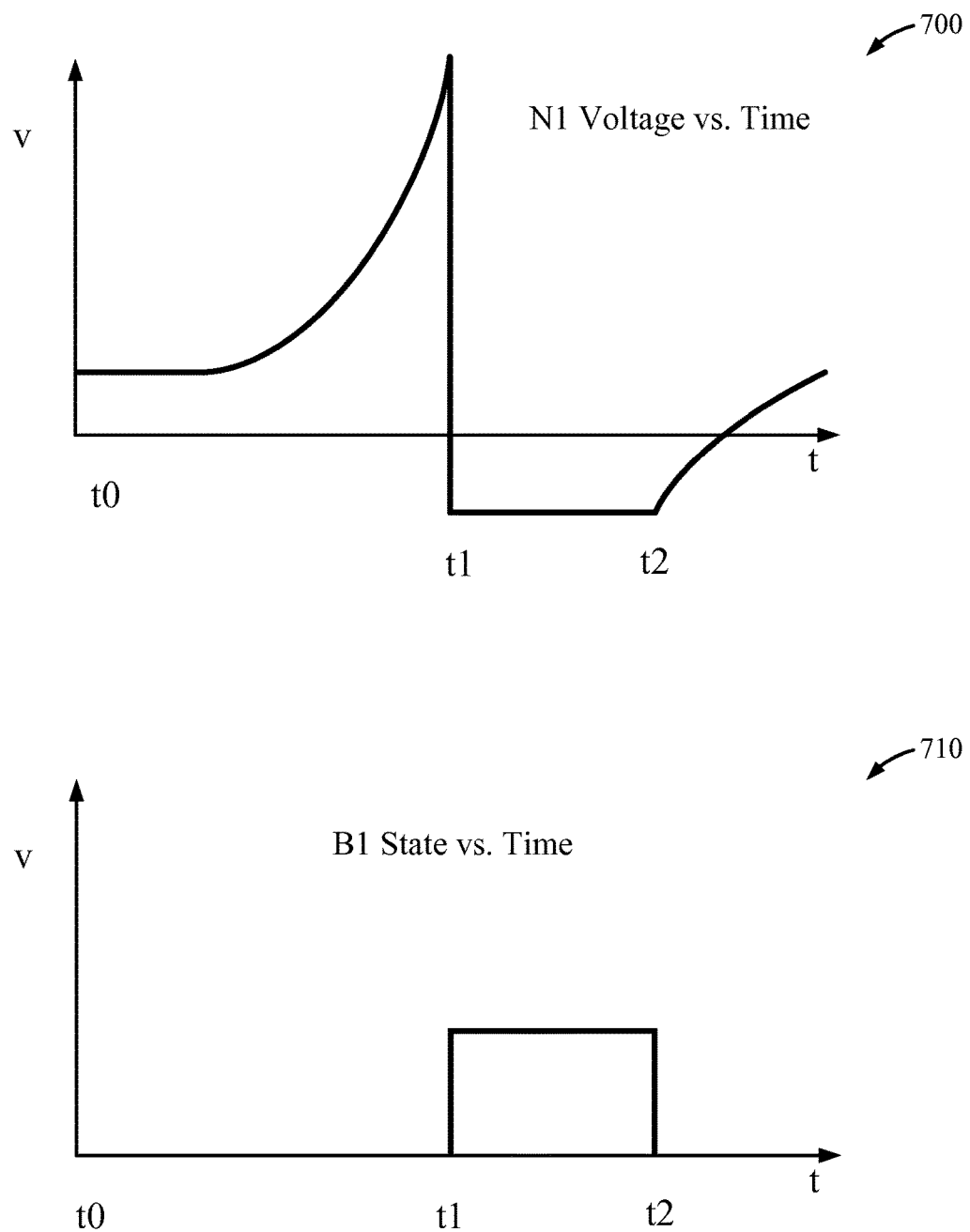
FIG. 7 illustrates example timing diagrams for synchronous event processing using a breakpoint neuron, in accordance with certain aspects of the present disclosure.

FIG. 7 illustrates example timing diagrams 700, 710 of synchronous event processing, in accordance with certain aspects of the present disclosure. During synchronous event processing, the breakpoint neuron (B1) may monitor spikes from the transmit neuron (N1). At t0, N1 is processing spike input. B1 is in the Running state and monitoring N1 (and perhaps one or more other artificial neurons). At t1, N1 goes above threshold and generates a spike. B1 receives the spike from N1, transitions to the Break state, and remains there. In the period between t1 and t2, N1 and B1 do not change state, although debugging may change the state of either or both N1 and B1. At t2, N1 neuron processing resumes. B1 receives the handled transition and returns to the Running state for monitoring.

Figure 8:
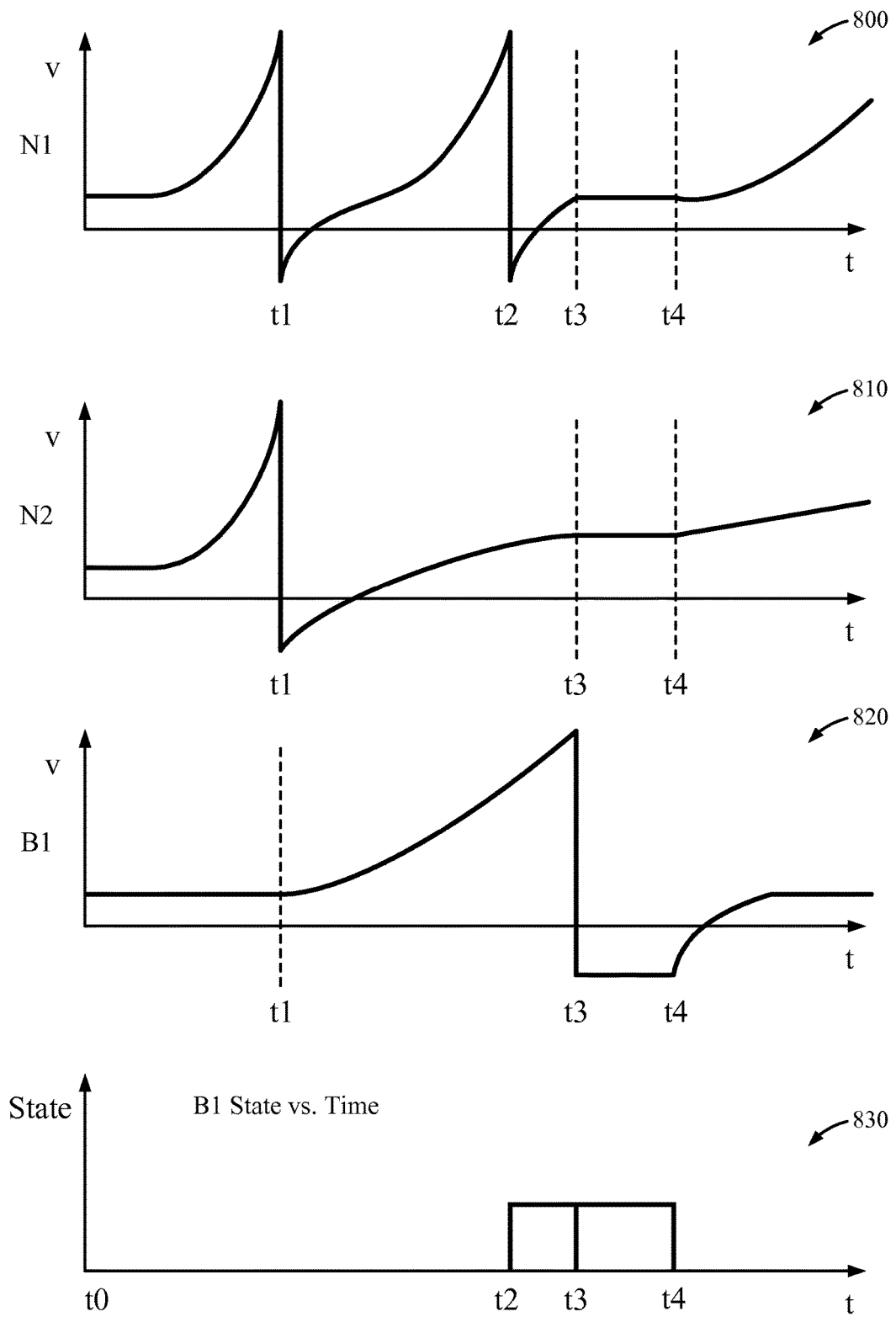
FIG. 8 illustrates example timing diagrams for delay event processing using a breakpoint neuron, in accordance with certain aspects of the present disclosure.

FIG. 8 illustrates example timing diagrams 800, 810, 820, 830 of delayed event processing (also known as asynchronous event processing) for a first transmit neuron (N1), a second transmit neuron (N2), a breakpoint neuron (B1), and for a state machine, respectively, in accordance with certain aspects of the present disclosure. During asynchronous event processing, the B1 may monitor spikes from transmit neurons N1 and N2. In this example, B1 is configured to cross a threshold when B1 receives two spikes from N1 and one spike from N2 within a specified time window. A breakpoint determination unit may be configured to respond to other desired conditions or combinations of conditions, as well.

At t0, N1 and N2 are processing spike input, and B1 is in the Running state and monitoring. At t1, N1 and N2 go above their thresholds, and each generates a spike. B1 does not cross its threshold, so B1 stays in the Running state. At t2, N1 goes above its threshold and generates a spike, while N2 is processing as usual. B1 detects the change, but is set to delay acting on it. The delta between t2 and t3 may manifest as synaptic transmission delay or be configured as neuron processing delay. B1 is held in a delayed sub-state in the Running state (after delay, B1 will transition to the Break state). At t3, B1 acts on the N1 and N2 spike inputs, goes above its threshold, and generates a break event. From t3 to t4, N1, N2, and B1 do not change state, although the process of debugging or intentionally modifying a component parameter may change the state(s) of N1, N2, and/or B1. At t4, N1 and N2 neuron processing continues. B1 receives the handled transition and returns to the Running state for monitoring.

Figure 9:
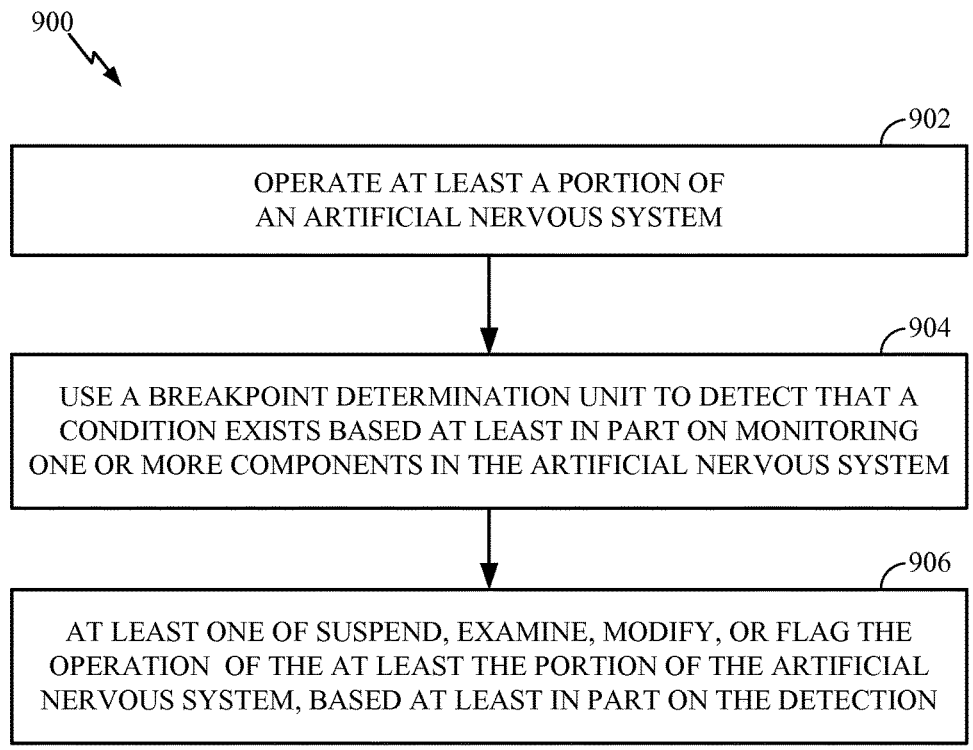
FIG. 9 is a flow diagram of example operations for examining an artificial nervous system using a breakpoint determination unit, in accordance with certain aspects of the present disclosure.

FIG. 9 is a flow diagram of example operations 900 for examining or debugging at least a portion of an artificial nervous system, in accordance with certain aspects of the present disclosure. The operations 900 may be viewed from the perspective of the system (which may be composed of a network of artificial neurons, synapses, neuromodulators, etc.) with a breakpoint determination unit, for example. The operations 900 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc.

The operations 900 may begin, at 902, by operating at least a portion of the artificial nervous system. At 904, a breakpoint determination unit (which may be in or external to the artificial nervous system) may be used to detect that a condition exists based, at least in part, on monitoring one or more components in the artificial nervous system. For example, the components may include neurons, synapses, neuromodulators, glia, and/or any of various other suitable components in the artificial nervous system. At 906, the operation of the at least the portion of the artificial nervous system may be at least one of suspended, examined, modified, or flagged, based at least in part on the detection at 904.

According to certain aspects, the operations 900 may further include outputting an indication of the condition based at least in part on the detection and determining to at least one of suspend, examine, modify, or flag the operation of the at least the portion of the artificial nervous system, based at least in part on the indication. For example, the indication of the condition may include at least one of an interrupt, a flag being set, or a change in a status register. For certain aspects, the breakpoint determination unit is configured to output the indication of the condition. For certain aspects, the indication of the condition may provide an alert of one or more properties of one or more components in the artificial nervous system. The indication may include, for example, setting a flag indicating that the artificial nervous system, or a portion thereof, is in a debugging or break state or some other alert indicating that a particular device within or portion of an artificial nervous system is in a debugging or break state.

According to certain aspects, the breakpoint determination unit is configured to trigger an event transmitter based at least in part on the detection. In this case, the event transmitter may be configured to output the indication of the condition. After being triggered, the event transmitter may be configured to output the indication of the condition immediately, at an end of a current time step, before the next time step, or after a predetermined number of time steps have passed.

According to certain aspects, the condition may include at least one of a spiking event, an expectation of the spiking event, a combination of spiking events, an expectation of the combination of spiking events, or any combination thereof, from the one or more artificial neurons. For certain aspects, the condition may involve the combination of spiking events occurring within a specified time window. According to certain aspects, the condition involves a state of the breakpoint determination unit meeting or exceeding a threshold. For other aspects, the condition is based at least in part on a spiking rate or an expectation of the spiking rate.

According to certain aspects, the condition may be based, at least in part, on at least parameter of the one or more components (e.g., a system variable) changing by a predetermined amount. For example, the condition may include changes in synapse parameters, the introduction of neuromodulators, glia activity, a spiking rate by one or more neurons, or other properties in the artificial nervous system. Synapse parameters may include properties such as synaptic weighting and the amount of synaptic delay. In an artificial nervous system with simulated neuromodulators to modify such properties as plasticity or potentiation of one or more neurons, the condition may include changes in the amount by which neural inputs are scaled. Conditions based on glia activity may include the amount of background noise introduced into the artificial nervous system by one or more glia neurons. According to certain aspects, the condition may involve an amount of a change in one or more parameters or network variables occurring within a specified time window.

According to certain aspects, the breakpoint determination unit has at least some of the same capabilities as an artificial neuron. In this case, the breakpoint determination unit may be configured to output one or more spiking events after being activated.

According to certain aspects, an artificial nervous system may have more than one breakpoint determination unit. For example, an artificial nervous system may have a first breakpoint determination unit and one or more second breakpoint determination units. The first breakpoint determination unit may be used, for example, to activate (i.e., turn on) at least one of the one or more second breakpoint determination units. When activated, the one or more second breakpoint determination units may monitor various parameters in the artificial nervous system and trigger a break event, as described above. The first breakpoint determination unit may also deactivate (i.e., turn off) the activated one or more second breakpoint determination units based on one or more parameters.

According to certain aspects, the operations 900 may further entail configuring the breakpoint determination unit with the condition and the one or more artificial neurons to be monitored, before the detecting at 904.

Figure 10:
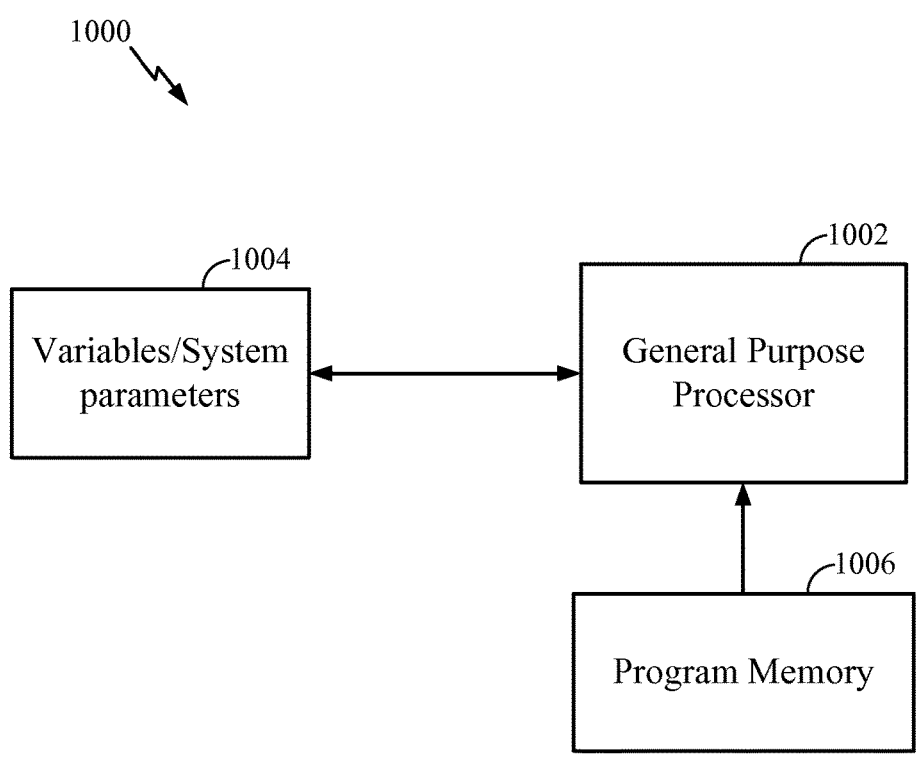
FIG. 10 illustrates example components for implementing examination of at least a portion of an artificial nervous system using a general-purpose processor, in accordance with certain aspects of the present disclosure.

FIG. 10 illustrates a diagram 1000 of example components for examining at least a portion of an artificial nervous system using a general-purpose processor 1002 in accordance with certain aspects of the present disclosure. Variables (neural signals), synaptic weights, and/or system parameters associated with a computational network (neural network) may be stored in a memory block 1004, while instructions related executed at the general-purpose processor 1002 may be loaded from a program memory 1006. In an aspect of the present disclosure, the instructions loaded into the general-purpose processor 1002 may comprise code for operating the at least the portion of the network of artificial neurons; code for using the breakpoint determination unit to detect that a condition exists based at least in part on monitoring one or more components in the artificial nervous system; and code for at least one of suspending, examining, modifying, or flagging the operation of the at least the portion of the artificial nervous system, based at least in part on the detection.

Figure 11:
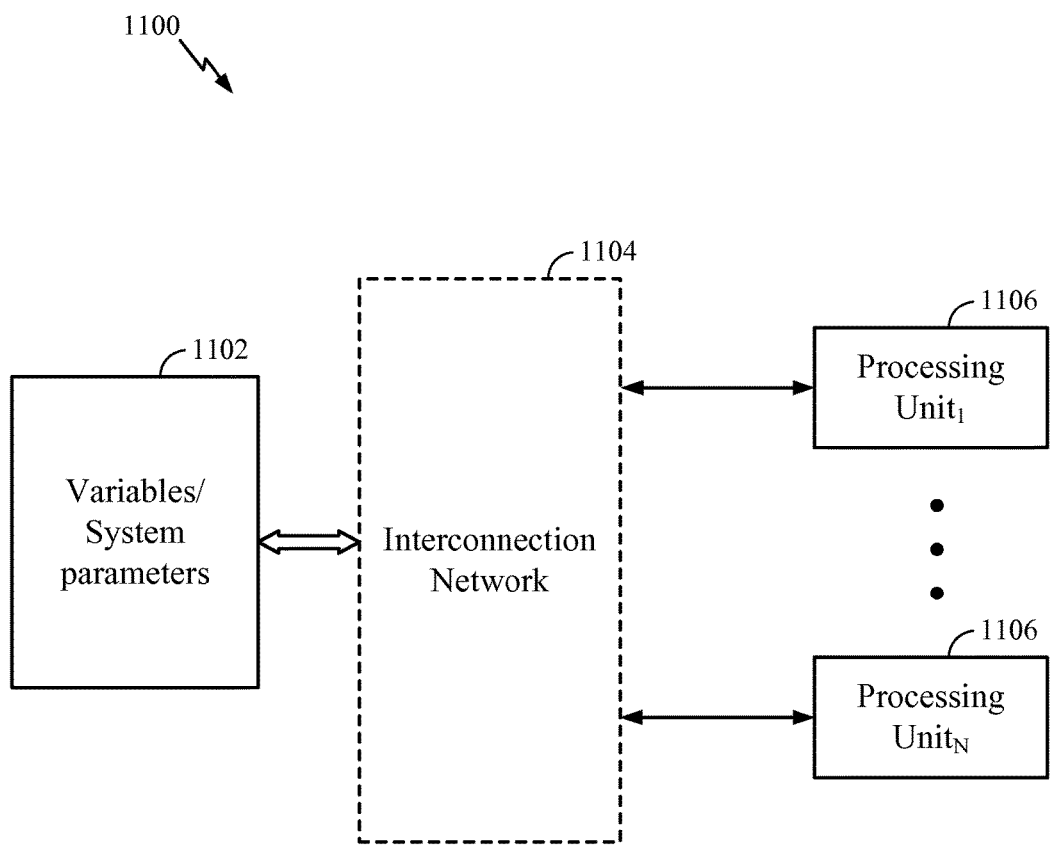
FIG. 11 illustrates example components for implementing examination of at least a portion of an artificial nervous system where a memory may be interfaced with individual distributed processing units, in accordance with certain aspects of the present disclosure.

FIG. 11 illustrates a block diagram 1100 of example components for examining at least a portion of an artificial nervous system where a memory 1102 can be interfaced via an interconnection network 1104 with individual (distributed) processing units (neural processors) 1106 of a computational network (neural network) in accordance with certain aspects of the present disclosure. Variables (neural signals), synaptic weights, and/or system parameters associated with the computational network (neural network) may be stored in the memory 1102, and may be loaded from the memory 1102 via connection(s) of the interconnection network 1104 into each processing unit (neural processor) 1106. In an aspect of the present disclosure, the processing unit 1106 may be configured to operate at least a portion of the artificial nervous system; to use the breakpoint determination unit to detect that a condition exists based at least in part on monitoring one or more components in the artificial nervous system; and to at least one of suspend, examine, modify, or flag the operation of the at least the portion of the artificial nervous system, based at least in part on the detection.

Figure 12:
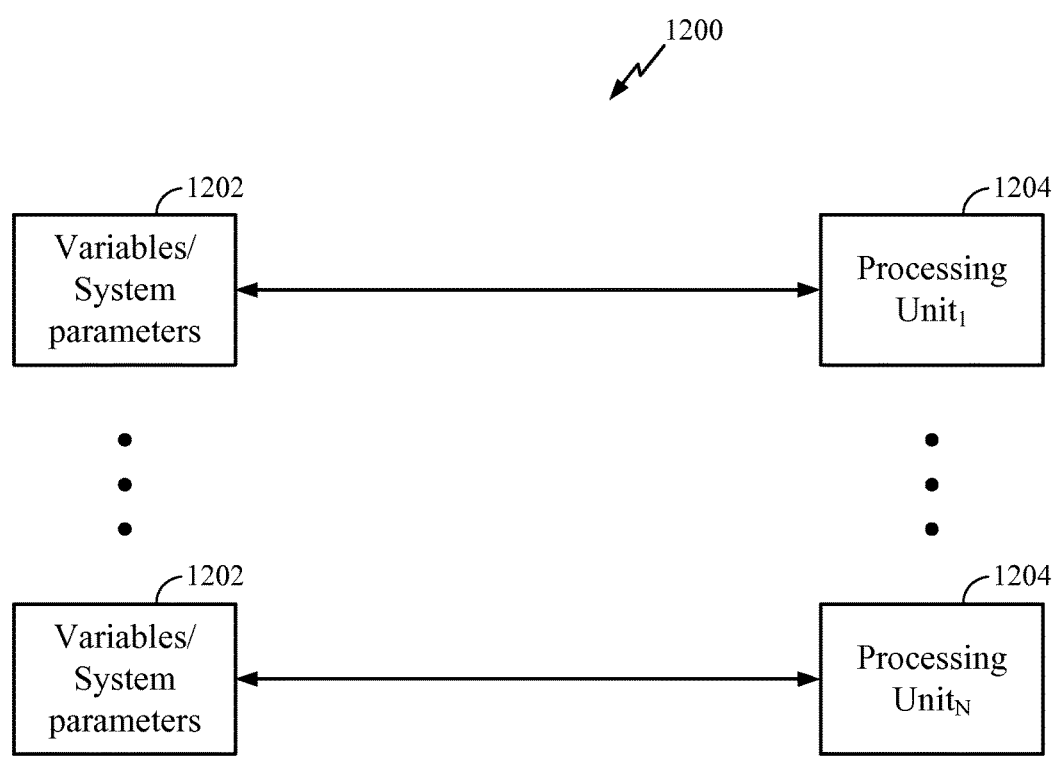
FIG. 12 illustrates example components for implementing examination of at least a portion of an artificial nervous system based on distributed memories and distributed processing units, in accordance with certain aspects of the present disclosure.

FIG. 12 illustrates a block diagram 1200 of example components for examining at least a portion of an artificial nervous system based on distributed memories 1202 and distributed processing units (neural processors) 1204 in accordance with certain aspects of the present disclosure. As illustrated in FIG. 12, one memory bank 1202 may be directly interfaced with one processing unit 1204 of a computational network (neural network), wherein that memory bank 1202 may store variables (neural signals), synaptic weights, and/or system parameters associated with that processing unit (neural processor) 1204. In an aspect of the present disclosure, the processing unit(s) 1204 may be configured to operate at least a portion of the artificial nervous system; to use a breakpoint determination unit to determine that a condition exists based at least in part on monitoring one or more components in the artificial nervous system; and to at least one of suspend, examine, modify, or flag the operation of the at least the portion of the artificial nervous system, based at least in part on the detection.

Figure 13:
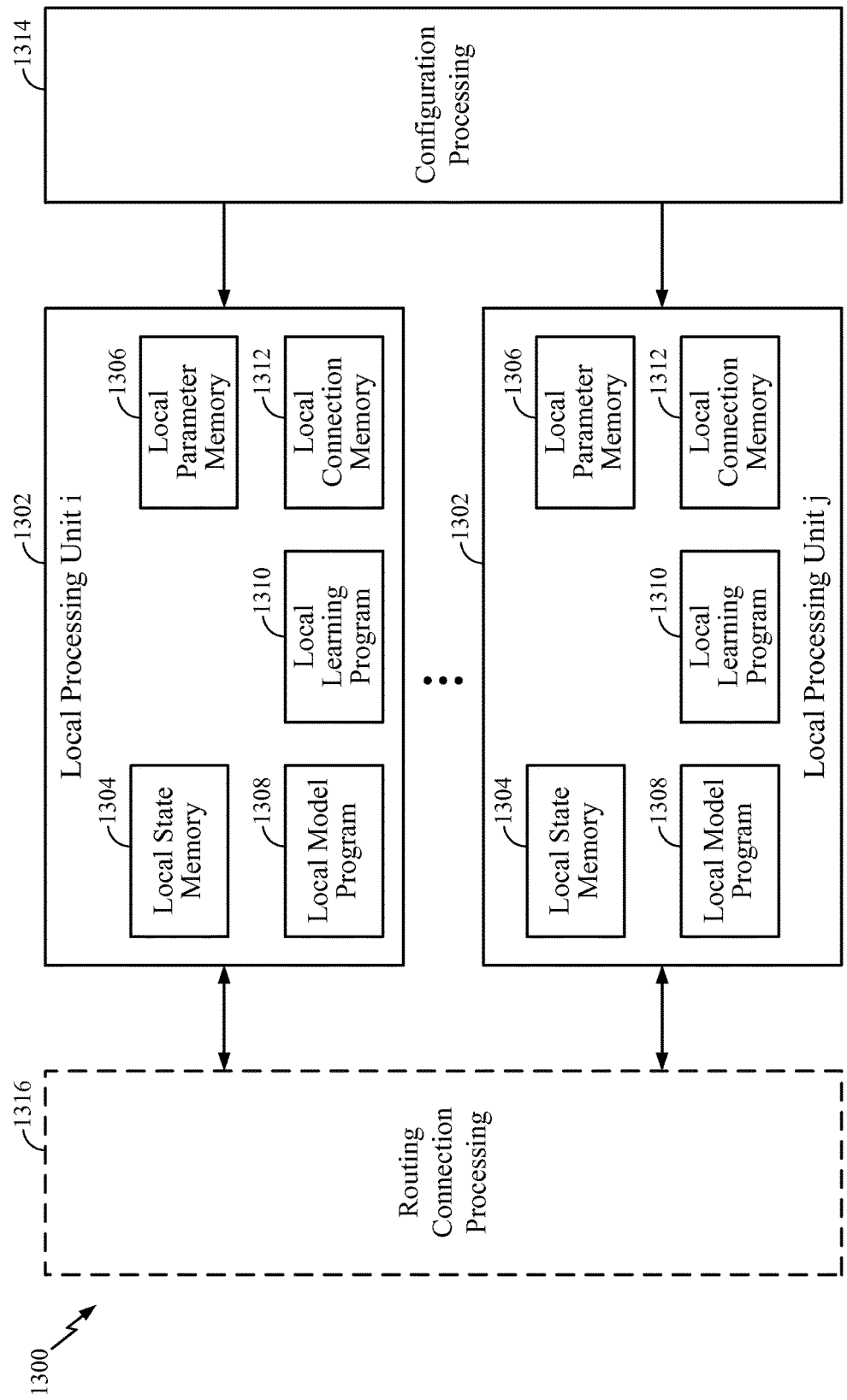
FIG. 13 illustrates an example implementation of a neural network in accordance with certain aspects of the present disclosure.

FIG. 13 illustrates an example implementation of a neural network 1300 in accordance with certain aspects of the present disclosure. As illustrated in FIG. 13, the neural network 1300 may comprise a plurality of local processing units 1302 that may perform various operations of methods described above. Each processing unit 1302 may comprise a local state memory 1304 and a local parameter memory 1306 that store parameters of the neural network. In addition, the processing unit 1302 may comprise a memory 1308 with a local (neuron) model program, a memory 1310 with a local learning program, and a local connection memory 1312. Furthermore, as illustrated in FIG. 13, each local processing unit 1302 may be interfaced with a unit 1314 for configuration processing that may provide configuration for local memories of the local processing unit, and with routing connection processing elements 1316 that provide routing between the local processing units 1302.

According to certain aspects of the present disclosure, each local processing unit 1302 may be configured to determine parameters of the neural network based upon desired one or more functional features of the neural network, and develop the one or more functional features towards the desired functional features as the determined parameters are further adapted, tuned and updated.

Figure 9A:
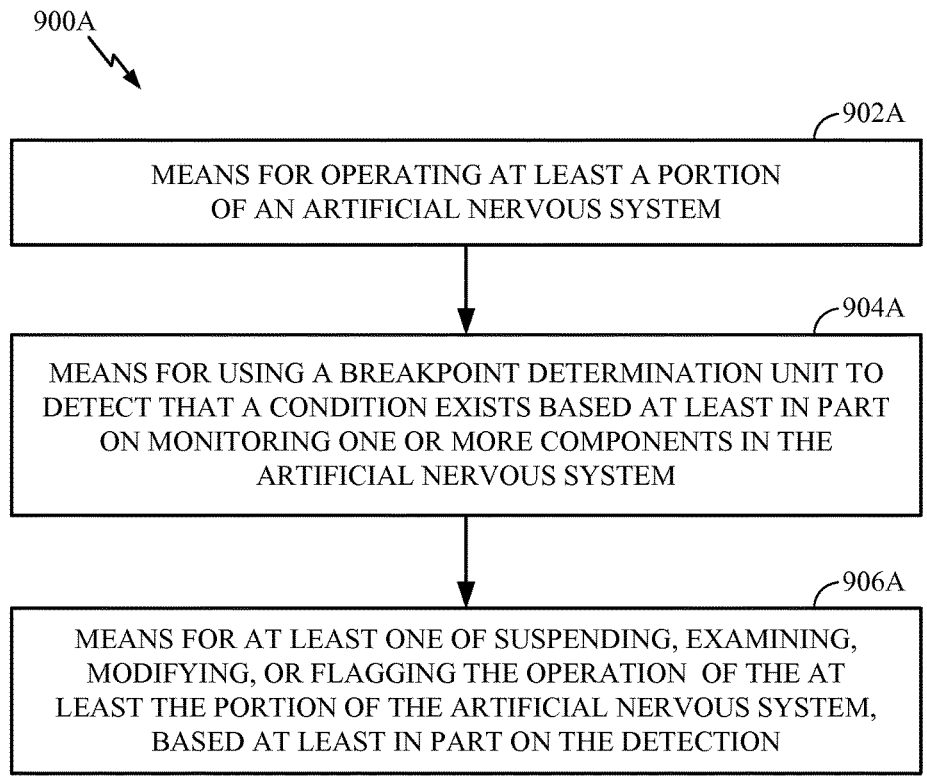
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 10-13. Generally, where there are operations illustrated in figures, those operations may have corresponding counterpart means-plus-function components with similar numbering. For example, operations 900 illustrated in FIG. 9 correspond to means 900A illustrated in FIG. 9A.

For example, means for displaying may comprise a display (e.g., a monitor, flat screen, touch screen, and the like), a printer, or any other suitable means for outputting data for visual depiction (e.g., a table, chart, or graph). Means for processing, means for operating, means for detecting, means for at least one of suspending, examining, or flagging, means for outputting, means for configuring, or means for determining may comprise a processing system, which may include one or more processors or processing units. Means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for using a breakpoint determination unit comprising a breakpoint neuron to examine an artificial nervous system, comprising:
   operating at least a portion of the artificial nervous system;
   using the breakpoint neuron to detect that a condition exists based at least in part on monitoring one or more components in the artificial nervous system; and
   at least one of suspending, examining, modifying, or flagging the operation of the at least the portion of the artificial nervous system, based at least in part on the detection.

2. The method of claim 1, further comprising:
   outputting an indication of the condition based at least in part on the detection; and
   determining to at least one of suspend, examine, modify, or flag the operation of the at least the portion of the artificial nervous system, based at least in part on the indication.

3. The method of claim 2, wherein the indication of the condition comprises at least one of an interrupt, a flag being set, or a change in a status register.

4. The method of claim 2, wherein the breakpoint determination unit is configured to output the indication of the condition.

5. The method of claim 4, wherein the indication of the condition provides an alert of one or more properties of the one or more components in the artificial nervous system.

6. The method of claim 2, wherein the breakpoint neuron is configured to trigger an event transmitter based at least in part on the detection and wherein the event transmitter is configured to output the indication of the condition.

7. The method of claim 6, wherein the event transmitter, after being triggered, is configured to output the indication of the condition immediately, at an end of a current time step, before the next time step, or after a predetermined number of time steps have passed.

8. The method of claim 1, wherein the condition comprises at least one of a spiking event, an expectation of the spiking event, a combination of spiking events, an expectation of the combination of spiking events, or any combination thereof, from the one or more components.

9. The method of claim 8, wherein the condition comprises the combination of spiking events occurring within a specified time window.

10. The method of claim 1, wherein the condition comprises a state of the breakpoint neuron meeting or exceeding a threshold.

11. The method of claim 1, wherein the condition is based at least in part on a spiking rate or an expectation of the spiking rate.

12. The method of claim 1, wherein the condition is based at least in part on at least one parameter of the one or more components changing by a predetermined amount.

13. The method of claim 1, wherein the breakpoint neuron has at least some of the same capabilities as an artificial neuron.

14. The method of claim 13, wherein the breakpoint neuron is configured to output one or more spiking events after being activated.

15. The method of claim 1, further comprising configuring the breakpoint determination unit with the condition and the one or more components to be monitored, before the detecting.

16. An apparatus for using a breakpoint determination unit comprising a breakpoint neuron to examine an artificial nervous system, comprising:
    a processing system configured to:
       operate at least a portion of the artificial nervous system;
       use the breakpoint neuron to detect that a condition exists based at least in part on monitoring one or more components in the artificial nervous system; and
       at least one of suspend, examine, modify, or flag the operation of the at least the portion of the artificial nervous system, based at least in part on the detection; and
    a memory coupled to the processing system.

17. The apparatus of claim 16, wherein the processing system is further configured to:
    output an indication of the condition based at least in part on the detection; and
    determine to at least one of suspend, examine, modify, or flag the operation of the at least the portion of the artificial nervous system, based at least in part on the indication.

18. The apparatus of claim 17, wherein the indication of the condition comprises at least one of an interrupt, a flag being set, or a change in a status register.

19. The apparatus of claim 17, wherein the breakpoint determination unit is configured to output the indication of the condition.

20. The apparatus of claim 19, wherein the indication of the condition provides an alert of one or more properties of the one or more components in the artificial nervous system.

21. The apparatus of claim 17, wherein the breakpoint neuron is configured to trigger an event transmitter based at least in part on the detection and wherein the event transmitter is configured to output the indication of the condition.

22. The apparatus of claim 21, wherein the event transmitter, after being triggered, is configured to output the indication of the condition immediately, at an end of a current time step, before the next time step, or after a predetermined number of time steps have passed.

23. The apparatus of claim 16, wherein the condition comprises at least one of a spiking event, an expectation of the spiking event, a combination of spiking events, an expectation of the combination of spiking events, or any combination thereof, from the one or more components.

24. The apparatus of claim 23, wherein the condition comprises the combination of spiking events occurring within a specified time window.

25. The apparatus of claim 16, wherein the condition comprises a state of the breakpoint neuron meeting or exceeding a threshold.

26. The apparatus of claim 16, wherein the condition is based at least in part on a spiking rate or an expectation of the spiking rate.

27. The apparatus of claim 16, wherein the condition is based at least in part on at least one parameter of the one or more components changing by a predetermined amount.

28. The apparatus of claim 16, wherein the breakpoint neuron has at least some of the same capabilities as an artificial neuron.

29. The apparatus of claim 28, wherein the breakpoint neuron is configured to output one or more spiking events after being activated.

30. The apparatus of claim 16, wherein the processing system is further adapted to configure the breakpoint determination unit with the condition and the one or more components to be monitored, before the detecting.

31. An apparatus for using a breakpoint determination unit comprising a breakpoint neuron to examine an artificial nervous system, comprising:
   means for operating at least a portion of the artificial nervous system;
   means for using the breakpoint neuron to detect that a condition exists based at least in part on monitoring one or more components in the artificial nervous system; and
   means for at least one of suspending, examining, modifying, or flagging the operation of the at least the portion of the artificial nervous system, based at least in part on the detection.

32. A non-transitory computer-readable medium for using a breakpoint determination unit comprising a breakpoint neuron to examine an artificial nervous system, the computer-readable medium having instructions executable to:
   operate at least a portion of the artificial nervous system;
   use the breakpoint neuron to detect that a condition exists based at least in part on monitoring one or more components in the artificial nervous system; and
   at least one of suspend, examine, modify, or flag the operation of the at least the portion of the artificial nervous system, based at least in part on the detection.

* * * * *